(12) United States Patent
Parimi (10) Patent No.: US 8,042,024 B2
(45) Date of Patent: Oct. 18, 2011

(54) METHOD, SYSTEM, AND COMPUTER PROGRAM PRODUCT FOR RECONSTRUCTING A DATA STREAM

(75) Inventor: Rakesh K. Parimi, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 1323 days.

(21) Appl. No.: 11/619,745

(22) Filed: Jan. 4, 2007

(65) Prior Publication Data

US 2008/0168102 A1    Jul. 10, 2008

(51) Int. Cl.
*H03M 13/00*    (2006.01)
(52) U.S. Cl. ........................ 714/776; 714/746
(58) Field of Classification Search .................. 714/776, 714/746
See application file for complete search history.

(56) References Cited

U.S. PATENT DOCUMENTS

2002/0107863 A1 *    8/2002    Hickey .......................... 707/101

* cited by examiner

*Primary Examiner* — Guy Lamarre
(74) *Attorney, Agent, or Firm* — Cantor Colburn LLP; Wenjie Li (57) ABSTRACT

A method, system, and computer program product for reconstructing a data stream are provided. The method includes listening to an original data stream, and extracting messages from the original data stream. The method further includes determining statistical data from the extracted messages, and creating a reconstructed data stream using the statistical data.

17 Claims, 7 Drawing Sheets

METHOD, SYSTEM, AND COMPUTER PROGRAM PRODUCT FOR RECONSTRUCTING A DATA STREAM

BACKGROUND OF THE INVENTION

This invention relates generally to data modeling, and more particularly to a method, system, and computer program product for reconstructing a data stream.

The ability to reconstruct data from an original data source is useful in a variety of applications and may assist in achieving various goals. Data reconstruction may be used on projects that involve data conversion, storage, or analysis. Data reconstruction may be useful in support of reverse engineering of a system, and may also enable the development of a model of a data consumer or producer to support system testing. Reconstructed data may be used to playback a data stream into a system for simulation purposes. Reconstructed data may also be used to supplement native data traffic on a networked system, or may assist in tilling gaps to replace missing data packets in a transmission.

In developing techniques to reconstruct data, accuracy in the reconstruction is important. An inaccurate reconstruction may appear as noise in the system, leading to poor system performance, while accurate data reconstruction may appear transparent to a consumer of the reconstructed data.

Although data capture, replay, storage, and conversion algorithms have been contemplated for various application specific solutions, such solutions fail to support a broad range of message types that may exist in a heterogeneous enterprise IT architecture. A heterogeneous enterprise IT architecture may contain a variety of computing systems, and employ multiple industry standard communication protocols. Furthermore, a heterogeneous enterprise IT architecture may be reconfigured dynamically, with components using a variety of communication protocols being added or removed from the system in an unpredictable manner. Application specific solutions for reconstructing data streams fail to meet the needs of a heterogeneous enterprise IT architecture in that they target only specific applications or protocols without providing robust support for multiple industry standard communication protocols.

Accordingly, there is a need for a method for reconstructing a data stream using industry standard communication protocols.

BRIEF SUMMARY OF THE INVENTION

Exemplary embodiments include a method for reconstructing a data stream. The method includes listening to an original data stream, and extracting messages from the original data stream. The method further includes determining statistical data from the extracted messages, and creating a reconstructed data stream using the statistical data.

In additional exemplary embodiments, a system for reconstructing a data stream includes a data producer, a data consumer, and a data stream reconstructor. The data stream reconstructor listens to an original data stream. The original data stream includes one or more messages between the data producer and the data consumer. The data stream reconstructor also extracts messages from the original data stream and determines statistical data from the extracted messages. Furthermore, the data stream reconstructor creates a reconstructed data stream using the statistical data.

In further exemplary embodiments, a computer program product for reconstructing a data stream includes a storage medium readable by a processing circuit and storing instructions for execution by the processing circuit for facilitating a method for reconstructing a data stream. The computer program product includes listening to an original data stream and extracting messages from the original data stream. The computer program product further includes determining statistical data from the extracted messages, and creating a reconstructed data stream using the statistical data.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments include a data reconstruction application, or application plug-in, for monitoring one or more data streams containing messages that are communicated between system components. A data stream, also referred to herein as an "original data stream", may exist in a variety of formats such as a binary stream, an American standard code for information interchange (ASCII) character stream, a combination thereof, or any other type of data stream format known in the art. Messages in the data stream may be partitioned as packets that include a combination of status, commands, and data pay load elements. As part of the monitoring process, messages may be collected and analyzed to discover the contents and format of the data contained within each message. The communicating system components may be any combination of data producers or data consumers. In exemplary embodiments, data reconstruction is performed by an application plug-in that is compatible with one or more industry standard communication protocols. The application plug-in may be a computer program product that interacts with one or more applications through one or more application provided interfaces or services. The industry standard communication protocols may be any standard known in the art including, but not limited to extensible markup language/document type definition (XML/DTD), web services, remote method invocation common object request broker architecture (RMI CORBA), message queue middleware (MQ), or hypertext transfer protocol (HTTP).

Figure 1:
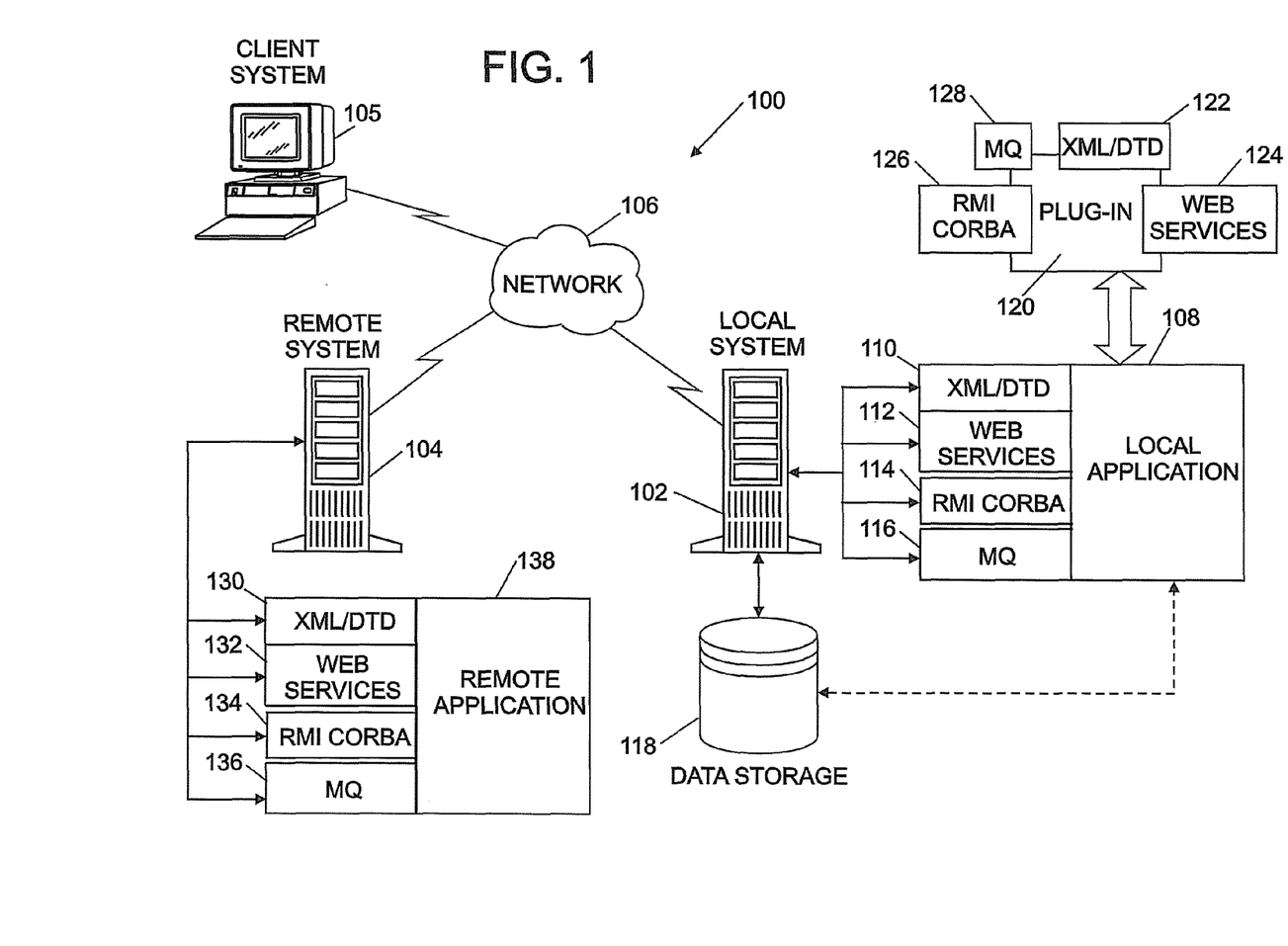
FIG. 1 is a block diagram of a system upon which data stream reconstruction may be implemented by exemplary embodiments.

Turning now to the drawings in greater detail, it will be seen that in FIG. 1 there is a block diagram of a system upon which data stream reconstruction can be implemented in accordance with exemplary embodiments. The system 100 of FIG. 1 includes a local system 102, a remote system 104, and a client system 105 communicably coupled over a network 106. The local system 102 and remote system 104 may be high-speed processing devices (e.g., mainframe computers) that handle large volumes of processing. In alternate exemplary embodiments, the local system 102 and remote system 104 are special purpose computing devices such as control or monitoring equipment in a manufacturing environment. In exemplary embodiments, the client system 105 comprises a desktop or general-purpose computer device that generates data and processing requests, such as requests to execute applications, access data, or perform updates to the local system 102 or remote system 104. For example, the client system 105 may request files that are stored in various storage systems, such as files in data storage device 118. While only a single local system 102 and a single remote system 104 are shown in FIG. 1, it will be understood that multiple local or remote systems may be implemented, each in communication with one another via direct coupling or via one or more networks. For example, multiple local or remote systems may be interconnected through a distributed network architecture. Hie single local system 102 and the single remote system 104 may also represent a cluster of systems accessing a common data store, e.g., via a clustered file system which is backed by a data storage device, such as data storage device 118.

The network 106 may be any type of communications network known in the art. For example, the network 106 may be an intranet, extranet, or an internetwork, such as the Internet, or a combination thereof. The network 106 may be a wireless or wireline network.

The data storage device 118 refers to any type of storage and may comprise a secondary storage element, e.g., hard disk drive, tape, or a storage subsystem that is external to the local system 102. Types of data that may be stored in data storage device 118 include archive data that are infrequently accessed, databases, and various files. It will be understood that data storage device 118 shown in FIG. 1 is provided for purposes of simplification and ease of explanation and is not to be construed as limiting in scope. To the contrary, there may be multiple data storage devices utilized by the local system 102 in exemplary embodiments.

In exemplary embodiments, the local system 102 executes various applications, including a local application 108. The local application 108 may support multiple industry standard communication protocols, including any combination of XML/DTD 110, web services 112, RMI CORBA 114, and MQ 116. The local application 108 may have access to the data storage device 118, either directly or through a file system. In exemplary embodiments, a plug-in 120 interfaces with the local application 108. The plug-in 120 may support multiple industry standard communication protocols, including any combination of XML/DTD 122, web services 124, RMI CORBA 126, and MQ 128. The plug-in 120 may interface to the local application 108 through common interfaces such as XML/DTD 110 and 122, web services 112 and 124, RMI CORBA 114 and 126, and MQ 116 and 128.

In exemplary embodiments, the remote system 104 executes various applications, including a remote application 138. The remote application 138 may support multiple industry standard communication protocols, including any combination of XML/DTD 130, web services 132, RMI CORBA 134, and MQ 136. In exemplary embodiments, the local application 108 is in communication with the remote application 138 over the network 106. The local application 108 may be a consumer or producer of data. Likewise, the remote application 138 may be a consumer or producer of data. For example, the remote application 138 may produce a data stream through the XML/DTD 130 interface, which may be received and consumed by the local application 108 through the XML/DTD 110 interface. In exemplary embodiments the plug-in 120 monitors or listens to the messages exchanged between the local application 108 and the remote application 138. Continuing with the example, the plug-in 120 may listen to XML/DTD communications from the remote application 138 to the local application 108 through the XML/DTD 122 interface. The plug-in 120 may interface with either or both of the local application 108 and the remote application 138.

The plug-in 120 may perform a variety of tasks related to data stream monitoring and reconstruction. After the plug-in 120 has been configured and connections with one or more application interfaces established, the plug-in 120 listens and extracts data from the data streams under observation. By monitoring large volumes of data, the plug-in 120 learns a variety of statistics and other characteristics of the data. In exemplary embodiments, the plug-in 120 stores data format and statistical information about the data streams under observation to the data storage device 118. The local application 108 provides the plug-in 120 with access to the data storage device 118. The data format and statistical information learned by the plug-in 120 may be used to reconstruct the data stream for a variety of uses. The output of the plug-in 120 may be data packets in a format similar to the producer or consumer application. In exemplary embodiments, the local application 108 performs data packet reconstruction using format, information defined by the plug-in 120 and stored in the data storage device 118.

In exemplary embodiments, the plug-in 120 is written in a platform independent programming language such as Java to allow the plug-in 120 to be portable and executable on a variety of systems. For example, the plug-in 120 can be run on the remote system 104 as a plug-in to the remote application 138. The plug-in 120 may be run-time upgradeable, enabling updates to algorithms or interfaces after the plug-in 120 has been deployed. In exemplary embodiments, a user of client system 105 updates the plug-in 120 to add new interfaces, protocol definitions, or otherwise alter the behavior of the plug-in 120.

Elements of the system 100 of FIG. 1 may be removed within the scope of the inventive principles disclosed herein. For example, although the exemplary embodiments of FIG. 1 depict the local application 108 and the remote application 138 executing upon different local and remote systems 102 and 104, in alternate exemplary embodiments, the local application 108 and the remote application 138 may execute upon the same system, such as the local system 104. Furthermore, the local application 108 and remote application 138 may not offer all communication interfacing types 110-116 and 130-136 depicted in FIG. 1, as a single communication interface type may be sufficient for performance of data stream reconstruction. The data storage device 118 may not be used in all embodiments, as the local system 102 may have an internal storage device. The client system 105 may be optional if the local system 102 is directly accessible without communication through the network 106. In some exemplary embodiments the plug-in 120 is dependent upon another application for services, such as the local application 108, while in alternate exemplary embodiments, the plug-in 120 is a stand-alone application capable of independent execution.

Figure 2:
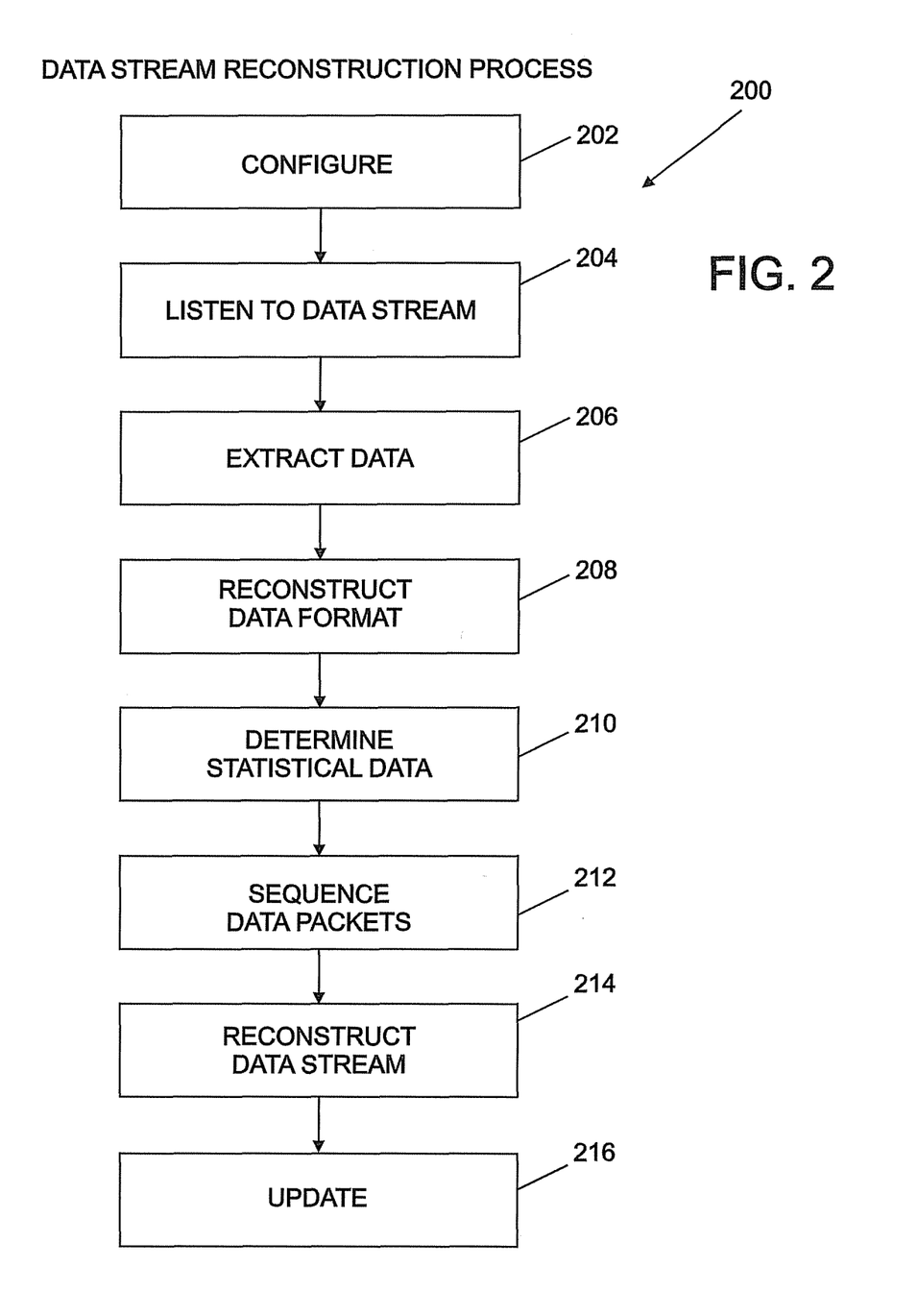
FIG. 2 is a flow diagram describing a data stream reconstruction process in exemplary embodiments.

Turning now to FIG. 2, a process for implementing data stream reconstruction in reference to the system 100 of FIG. 1 will now be described in accordance with exemplary embodiments. At block 202, the plug-in 120 is installed and configured with the associated application or applications, such as the local application 108. The communication interfaces between the plug-in 120 and the associated applications are identified, such as interfaces 110-116 and 122-128, and connection information with the correct level of security clearance is provided to the plug-in 120. A connection is established by using connection drivers that support the communication interfaces, such as interlaces 110-116 and 122-128. In exemplary embodiments, the plug-in 120 has all types of connection drivers available through the associated application. Therefore, once connection parameters are provided, the plug-in 120 may automatically connect to the remote application 138.

At block 204, the plug-in 120 listens to messages in data streams exchanged between a data producer and data consumer to which the plug-in 120 is interfaced. While listening, the plug-in 120 actively collects data messages being exchanged between the data producer and data consumer. In exemplary embodiments, messages are recorded in a log file for further data analysis.

At block 206, the plug-in 120 extracts data from the messages in data packets exchanged between interfacing applications to which the plug-in 120 is listening, such as the local application 108 and the remote application 138. In exemplary embodiments, a data packet holds a message that includes an ASCII identifier followed by a binary message body organized as fields. Since the messages are received through one of the communication interfaces that the plug-in 120 supports, such as interfaces 122-128, a high-level message format can be established. For example, if the plug-in 120 is listening to XML messages transferred from the remote application 138 to the local application 108 through the XML/DTD 122 interface, the plug-in 120 can parse the message into elements and tags based on standard XML formatting. The information within each message can then be further analyzed to determine detailed formatting and contents. Exemplary messages include event data, trace data, or process control data. The messages may be partitioned in a tokenized or field delimited format.

At block 208, reconstruction of data format is performed. In an iterative fashion, the plug-in 120 extracts and inspects data packets to reconstruct the data format for each variant under observation. In exemplary embodiments, the longer the extraction phase continues, the more precise the format reconstruction, as more data is analyzed. For example, the plug-in 120 may listen to messages between the local application 108 and the remote application 138 for a user controlled duration of time (e.g., twenty-four hours). Data format reconstruction enables the plug-in 120 to learn all of the variant formats produced or consumed by the interfacing applications. Data formats within a message may include a variety of data structures such as integers, floating-point numbers, date/time values, character strings, Booleans values, and enumerations. In exemplary embodiments, the data format includes datatype, field length, field structure, and identifiers. The field structure may be singular or multi-dimensional. In exemplary embodiments, the plug-in 120 knows the data format of data streams under observation based on preexisting information about the system that is incorporated into the plug-in 120. The data format may be established in real-time or through analysis of a recorded data log file.

At block 210, analysis of the data is performed to determine statistical data. In exemplary embodiments, the plug-in 120 utilizes various statistical analysis and techniques to construct a data model. The statistical data is determined through analysis of the data extracted from the data stream. For example, the plug-in 120 may monitor various data fields to establish values such as a high/low range, average, standard deviation, and variance. The statistical data is used to create a model of the data for each field of each message. The model can be used during the data reconstruction process to bound the values in each field for which data is reconstructed.

At block 212, data packet sequencing is performed, in data packet sequencing, the plug-in 120 attempts to sequence the variant format types, substituting simulated values for real values from data packets. Data packet sequencing is an iterative process. In exemplary embodiments, the plug-in 120 publishes a format sequencer that is highly accurate (e.g., up to ninety-nine percent accurate) after a sufficient number of iterations. The sequence of messages may be recorded in a log file for further analysis. In general, a larger sampling of messages will produce a more accurate format sequencer as the effect of anomalies or errors is diminished. While the plug-in 120 can publish a format sequencer with a high degree of accuracy, a less accurate format sequencer may be acceptable in some applications, such as a simple system stress testing application. In exemplary embodiments, the data format sequencer utilizes various pattern recognition techniques to construct a highly accurate sequence. For example, the plug-in 120 may analyze for repetition, such as a common message type at a fixed interval. In exemplary embodiments, the plug-in 120 monitors for sequence identification codes within the data, such as a start-of-job or end-of-job message. As any error messages are detected, the plug-in 120 may learn associated support messages or trace data related to a particular error message type. In exemplary embodiments, the plug-in 120 distinguishes message sequences based on relative timing between messages.

At block 214, reconstruction of the data streams is performed. Using the determined data format, statistical data, and data packet sequencer information, the plug-in 120 continues to inspect extracted data packets and may attempt to reconstruct data streams. The data format information establishes the overall structure for each message. The statistical data determined from the messages extracted from the data stream may be used in creating data for the reconstructed data stream. For example, through the statistical analysis of block 210, a given data field may be limited between a value of +/−10, with a standard deviation of 0.5. A random number generator may use this statistical information to produce a simulated data value for this field as part of the data reconstruction process. The data packet sequencer can arrange each reconstituted message in the proper sequence. In exemplary embodiments, the plug-in 120 attempts to validate the reconstructed data streams through cross validation with the original data streams. The plug-in 120 may create templates and produce pseudo-code describing an algorithm for producing data streams as an output. For example, the output of the plug-in 120 may state that a particular field (X) in given data packet (#100) contains values between 0.001 and 0.005 when another field (Y) is within ten percent of a target value; otherwise, the field X will be within five percent of 1. A computer language programmer or another application may use the pseudo-code output of the plug-in 120 to generate formal program code to further enhance the plug-in 120.

At block 216, the program code may be incorporated into the plug-in 120 as a modification to the dynamically loadable plug-in module. For example, message patterns detected by the plug-in 120 may be written to a text file in pseudo-code statements. A human can use the pseudo-code statements to develop software modules, such as Java classes, that create simulated data by incorporating the data format, data sequence, and statistical information. The software modules can be linked to or reincorporated into the plug-in 120 to support data reconstruction and further improve performance.

Figure 3:
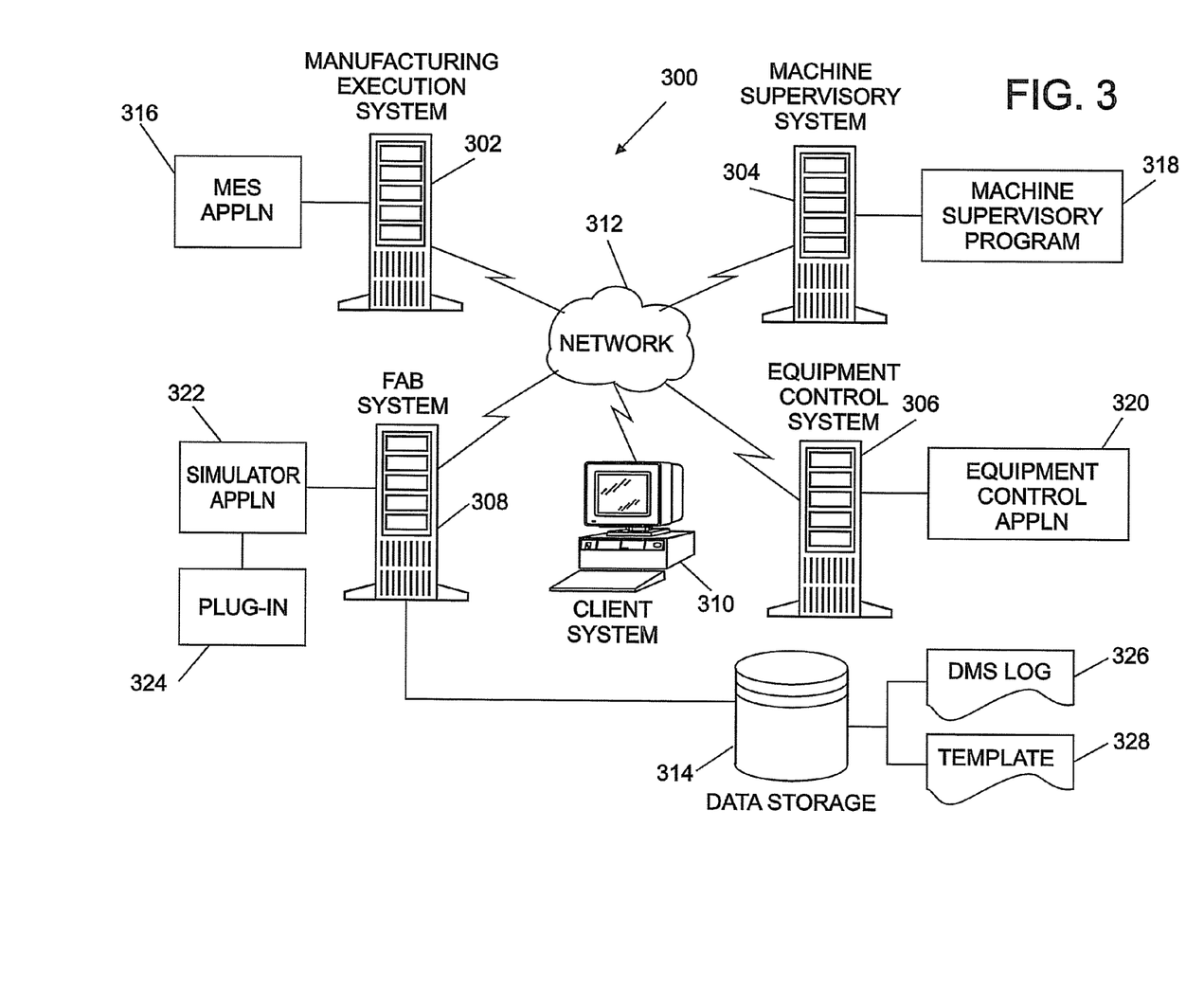
FIG. 3 is a block diagram of another system upon which data stream reconstruction may be implemented by alternate exemplary embodiments.

Turning now to FIG. 3 there is a block diagram of a system upon which data stream reconstruction can be implemented in accordance with exemplary embodiments. The system 300 of FIG. 3 includes a manufacturing execution system (MES) 302, a machine supervisory system 304, an equipment control system 306, a fabrication simulation system (FAB) 308, and a client system 310 communicably coupled over a network 312. In exemplary embodiments, the FAB 308 is connected to a data storage device 314. The MES 302 may be a mainframe computer, a server, or computing device capable of managing and monitoring a manufacturing environment. The machine supervisory system 304 may be a mainframe computer, a server, or computing device capable of managing and monitoring a specific machine within a manufacturing environment. The equipment control system 306 may be a mainframe computer, a server, or computing device capable of managing and monitoring equipment such as a manufacturing tool or tools associated with a specific machine within a manufacturing environment. The FAB 308 may be a mainframe computer, a server, or computing device capable of monitoring the activity of machines, tools, or other equipment, and simulating their behavior. Although the systems 302-310 are depicted as individual systems in FIG. 3, it will be understood that the systems 302-310 may be combined into any combination or sub-combination in accordance with exemplary embodiments. Each system 302-310 may also represent multiple subsystems.

Similar to the network 106 of FIG. 1, the network 312 of FIG. 3 may be any type of communications network known in the art. For example, the network 312 may be an intranet, extranet, or an internetwork, such as the Internet, or a combination thereof. The network 312 may be a wireless or wireline network.

The data storage device 314 refers to any type of storage and may comprise a secondary storage element, e.g., hard disk drive, tape, or a storage subsystem that is external to the FAB 308. Types of data that may be stored in data storage device 314 include archive data that are infrequently accessed, databases, and various files. There may be multiple data storage devices utilized by the FAB 308 in exemplary embodiments. Furthermore, the data storage device 314 may be internal to the FAB 308.

The MES 302 may execute a MES application 316. In exemplary embodiments, the MES application 316 controls the sequence of operations within a manufacturing environment. The manufacturing environment may include a variety of machines, equipment, or tools used to manufacture one or more products. The manufacturing environment may support a diverse variety of products and may be reconfigurable to adapt to manufacturing needs for specific products.

The machine supervisory system 304 may execute a machine supervisory program (MSP) 318. The MSP 318 controls one or more pieces of equipment or tools associated with a particular machine. In exemplary embodiments, the MES application 316 sends commands through the network 312 to request or command specific actions from the MSP 318.

The equipment control system 306 may execute an equipment control application 320. The equipment control application 320 may monitor and control specific equipment or a tool associated with a manufacturing process. In exemplary embodiments, the equipment control application 320 receives commands from the MSP 318 through the network 312. The equipment control application 320 may report status to the MSP 318. For example, the equipment control application 320 may provide the MSP 318 with periodic status messages such as a pressure, a temperature, or an amount of a chemical applied or remaining. Messages from the equipment control application 320 may occur on an event driven or periodic basis. The MES application 316 may also listen to messages between the MSP 318 and the equipment control application 320, and react accordingly. For example, if the MES application 316 detects an error condition, the MES application 316 may intervene and send instructions to the MSP 318 to attempt to remedy or accommodate the error condition.

The FAB 308 may execute a simulator application 322. The simulator application 322 may enable development or tests of other systems, such as the MES application 316, by simulating the messages of other system components, such as the MSP 318 or the equipment control application 320. In exemplary embodiments, an application plug-in 324 interfaces with the simulator application 322 to monitor and reconstruct data streams. The plug-in 324 may monitor communications over the network 312 to learn message format and content of various data producers and consumers, such as the MSP 318 or the equipment control application 320. The plug-in 324 may monitor data streams for messages related to the manufacturing of a particular product or collection of products. The plug-in 324 may create a data modeling structure (DMS) log file, such as DMS log file 326, to record information associated with each data message processed. The plug-in 324 may also create a template file, such as template file 326, that describes the data format and characteristics associated with messages for each product under observation in the manufacturing process. The data storage device 314 may hold all DMS log files and template files, such as DMS log file 326 and template file 328. In exemplary embodiments, the plug-in 324 accesses the data storage device 314 through the simulator application 322. In alternate exemplary embodiments, the plug-in 324 may be a stand-alone application and may be capable of accessing the data storage device 314 without reliance upon the simulator application 322.

The various applications and plug-in 316-324 of the system 300 may support a variety of industry standard communication protocols such as XML/DTD, web services, RMI CORBA, MQ, HTTP, or other standards known in the art. Although the various applications and plug-in 316-324 of the system 300 may support multiple communication protocols, only a single protocol may be used in some embodiments. Since the plug-in 324 may support a wide variety of communication protocols, data stream reconstruction may be performed regardless of the particular protocols utilized by the applications 316-322.

The client system 310 may interface with the systems 302-308 for various purposes, such as performing updates or accessing data files. In exemplary embodiments, the client system 310 may access template files, such as template file 328 on the data storage device 314, to validate the performance of the plug-in 324. The client system 310 may also be used to update the plug-in 324 in a dynamic manner.

Figure 4A:
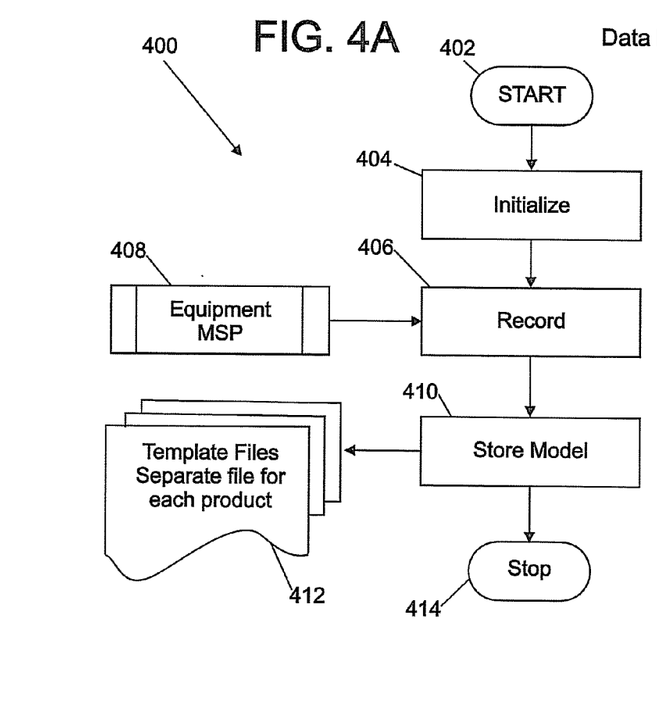
FIGS. 4A-4E illustrate a related series of flow diagrams describing a data stream reconstruction process that may be implemented by alternate exemplary embodiments.
Figure 4B:
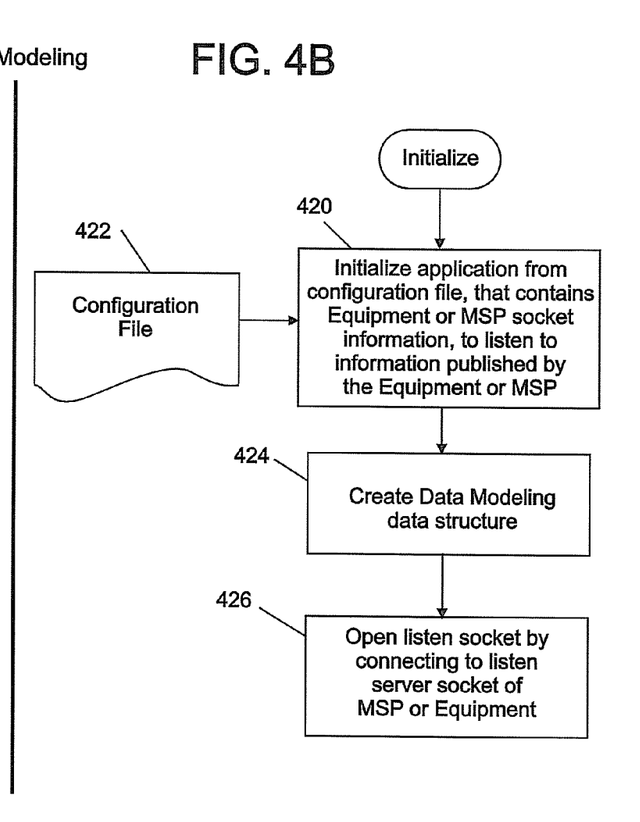

Turning now to FIGS. 4A-4E, a process for performing data modeling for data stream reconstruction in reference to the system 300 of FIG. 3 will now be described in accordance with exemplary embodiments. FIG. 4A depicts a high-level process flow for performing data modeling for data stream reconstruction, while FIGS. 4B-4E provide greater process detail. At block 402, the process flow 400 begins. At block 404, the sub-process to initiate data modeling, as detailed in FIG. 4B, is performed. Once the initiation of data modeling completes, block 406 is performed to record messages. Data messages published by equipment or MSP at block 408 are input to block 406. After block 406 completes, block 410 is performed to generate model data, outputting template files as separate files for each product at block 412. At block 414, the process 400 stops.

FIG. 4B depicts the contents of block 404 to initiate data modeling. At block 420, an application is initialized from a configuration file at block 422 that contains equipment or MSP socket information. The application may be a stand-alone application capable of performing data, modeling or it may be an application plug-in, such as plug-in 324 of FIG. 3. The configuration file at block 422 may be stored on a data storage device, such as the data storage device 314. In exemplary embodiments, the initialization allows the application to establish one or more connections for listening to information published by the equipment or MSP messages at block 408. The equipment or MSP socket information in the configuration file at block 422 may establish preferred communication protocol and security information.

At block 424, a data modeling structure (DMS) is created to support recording of data messages. The data modeling structure may contain one or more records. Each record may include fields such as product characteristics, job characteristics, state characteristics, a list of data for a job, identification to previous product processed on equipment, and the total number of iterations. In exemplary embodiments, the structure of the data messages is known, enabling efficient extraction of information.

At block 426, a listen socket is opened through connecting to a listen server socket of MSP or equipment, such as the MSP 318 or the equipment application 320 of FIG. 3. The connection may support a variety of industry standard communication protocols such as XML/DTD, web services, RMI CORBA, MQ, HTTP, or other standards known in the art.

Figure 4C:
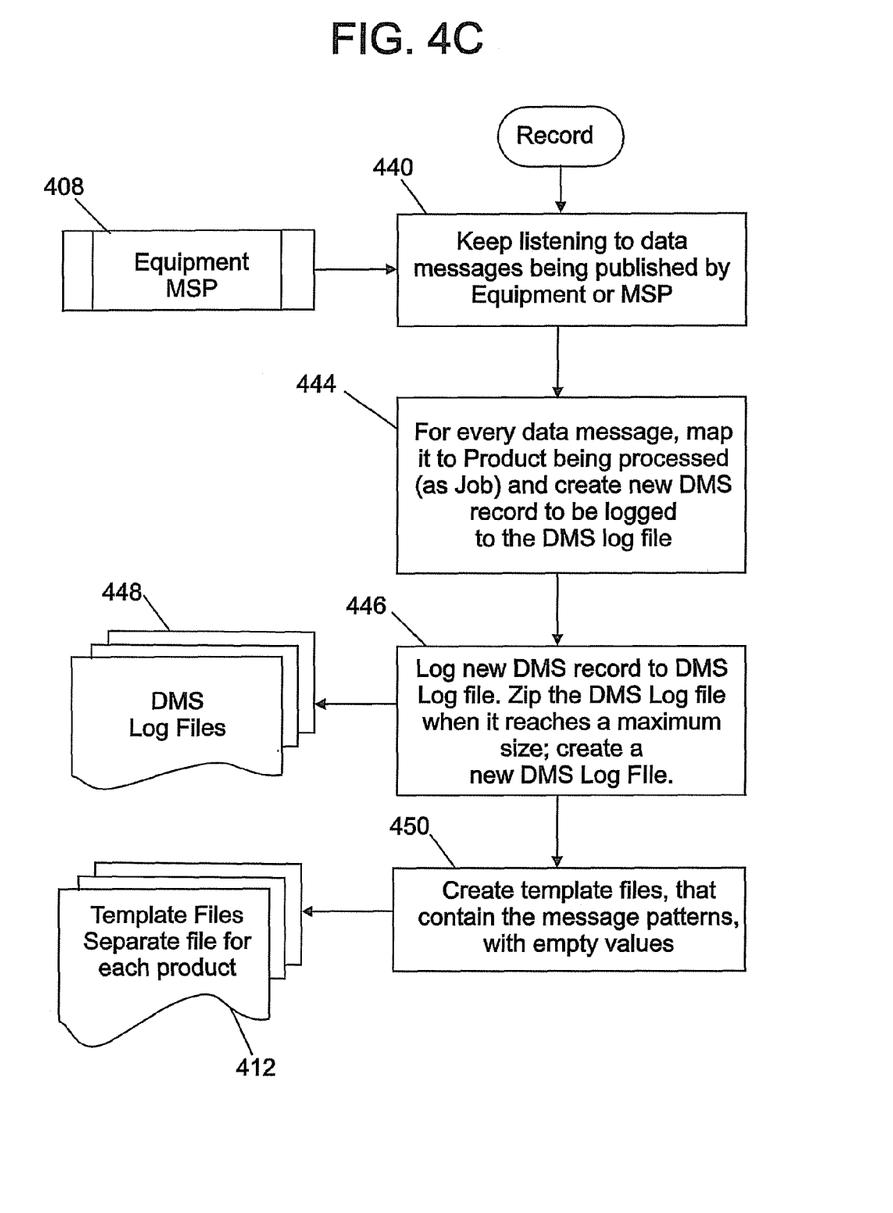

FIG. 4C depicts the contents of block 406 to record messages. At block 440, the application or plug-in listens to data messages published as equipment or MSP messages at block 408. The equipment messages may be generated by the equipment control application 320, and the MSP messages may be generated by the MSP 318.

At block 444, every data message received is mapped to a product being manufactured or processed as part of a production job. A new DMS record is created for each data message received. Each DMS record may contain a variety of information related to the message received, such as production characteristics, time stamps, and other identification information.

At block 446, a new DMS record is written to DMS log files at block 448. The DMS log files at block 448, may be one or more of the DMS log file 326 depicted in FIG. 3. The DMS log files at block 448 may contain a variety of records, as multiple manufacturing processes may be active at the same time. For example, there may be multiple machines active resulting in multiple MSP messages, and similarly, each MSP may be in communication with multiple equipment controls. Alternatively, one machine may be able to create two different products in parallel. Multiple DMS log files may be created sequentially in time, as the size of each file reaches a maximum size. In exemplar) embodiments, a DMS log file is compressed when it reaches a maximum size, and a new DMS log file is created. The file compression format may be any compression format known in the art, such as a zip file.

At block 450, template files at block 412 are created for each product. The template files at block 412 may be may be one or more of the template file 328 depicted in FIG. 3. The template files at block 412 may include message patterns with empty values. The message patterns may be written for each message that has an identifiable structure. The template files at block 412 may be used to establish sequences of messages.

Figure 4D:
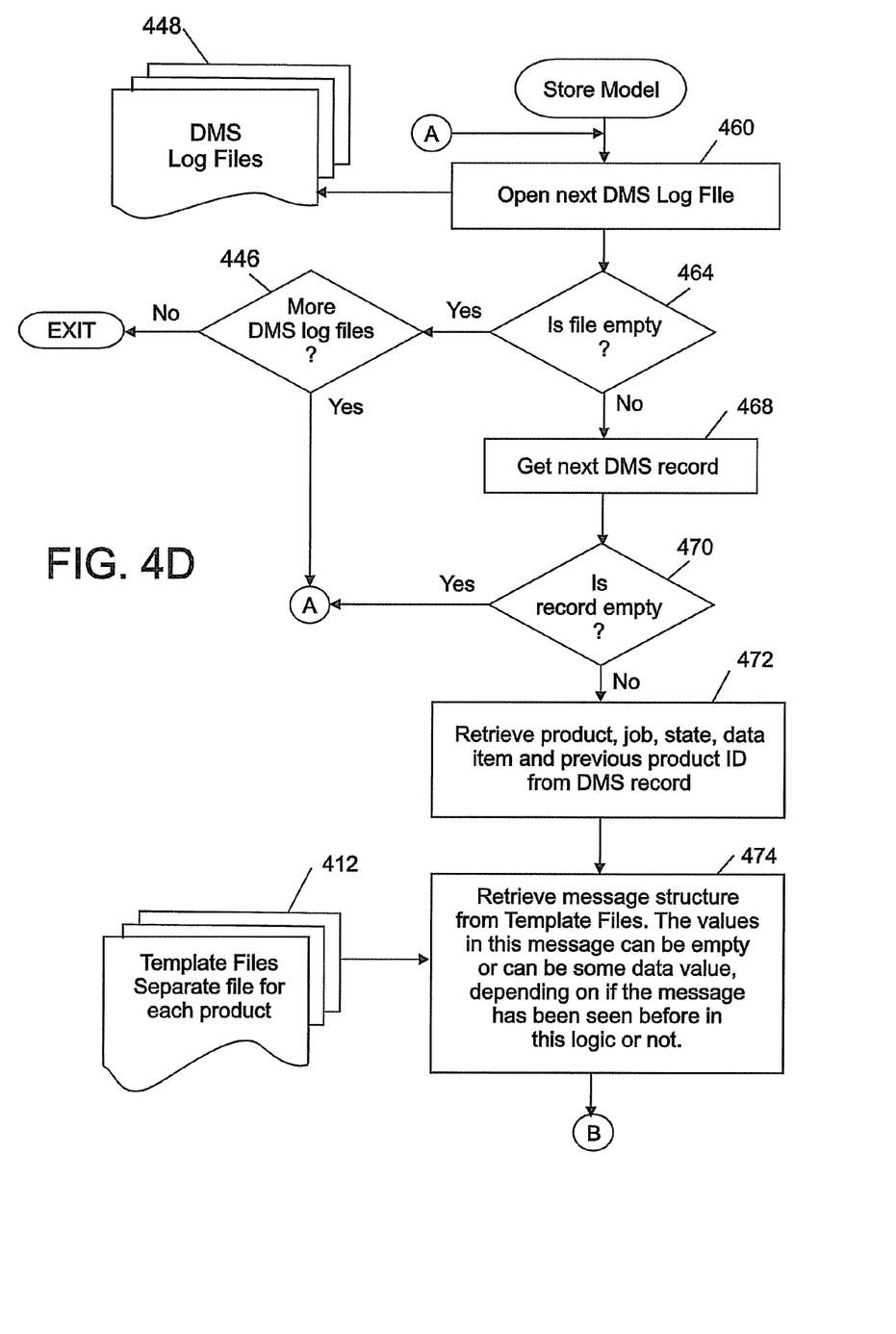

FIG. 4D depicts the first part of the contents of block 410, which may generate model data. At block 460, a DMS log file at block 448 is opened. Each DMS log file at block 448 may be analyzed to determine the contents of the recorded messages. At block 464, a sequential check may be performed to determine whether each DMS log file at block 448 is empty. If the DMS log file under analysis at block 448 is empty, then a further check is performed at block 466 to determine whether there are more DMS log files. At block 466, if there are more DMS log files, then block 460 is performed; otherwise, block 414 is performed that terminates the process. At block 464, if the file is not empty, then block 468 gets the next DMS record. At block 470, a check is performed to determine is the DMS record is empty. If the DMS record is empty, then block 460 is performed; otherwise, block 472 is performed. At block 472, information is retrieved from the DMS record, such as product, job, state, data item and previous product ID. At block 474, the message structure and message values are retrieved from template files at block 412. The values in the message may be empty, or there may be data depending on whether the message has been previously examined.

Figure 4E:
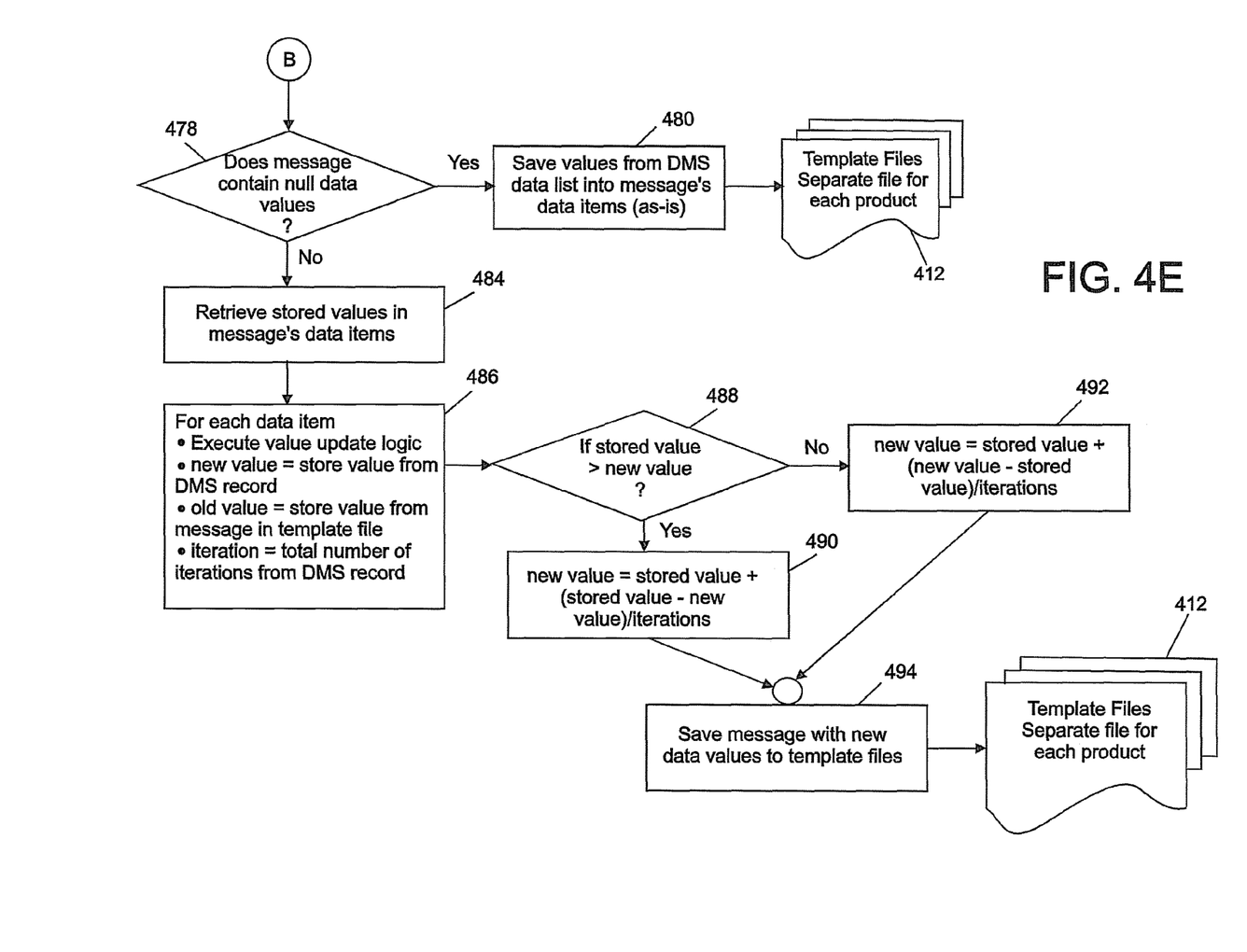

FIG. 4E depicts the second part of the contents of block 410, which may generate model data. At block 478, a check is performed to determine whether the current message under analysis contains null data, values. If the message does contain null data values, block 480 is performed; otherwise, block 484 is performed. At block 480, values from the DMS record data are saved into message data items and written to the template file for the product at block 412. At block 484, the stored values are retrieved from the message data items in the associated template file.

At block 486, for each data item, multiple steps may be performed. The multiple steps include: executing value update logic, setting the new value equal to the value from the DMS record, setting the old value equal to the stored value from the message template file 412 and setting an iteration count equal to the total number of iterations from the DMS record. This process updates the data values used to generate model data.

At block 488, if the stored value is greater than the new value, then block 490 is performed; otherwise, block 492 is performed. At block 490, the new value may be set equal to the stored value plus, the stored value minus the new value, divided by the number of iterations. At block 492, the new value may be set equal to the stored value plus, the new value minus the stored value, divided by the number of iterations. The combined blocks 488-492 may allow the new value to be stored to change gradually over a number of iterations. Alternate methods may be used to establish or alter the rate of change between a stored value and a new value, such as a low pass filter function. At block 494, the message with new data values is saved to the template files at block 412. The data stored to the template files at block 412 may be used as model data for a variety of applications, such as simulation or testing.

Technical effects and benefits of exemplary embodiments include reconstructing a data stream with a high level of accuracy using industry standard communication protocols. Further technical effects include extracting data, recording data, determining statistical information about the data, and developing a sequence of data messages.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for reconstructing a data stream, the method comprising:
    listening to an original data stream;
    extracting messages from the original data stream;
    determining statistical data from the extracted messages;
    creating a reconstructed data stream using the statistical data;
    determining a sequence of messages from the extracted messages;
    creating model data from the statistical data;
    creating a sequence of data packets from the sequence of messages and model data; and
    outputting the sequence of data packets as the reconstructed data stream.

2. The method of claim 1, wherein the method is implemented by an application plug-in.

3. The method of claim 1, wherein the original data stream comprises one or more messages between a data producer and a data consumer.

4. The method of claim 1, wherein the original data stream comprises messages in an industry standard communication protocol.

5. The method of claim 4, wherein the industry standard communication protocol comprises at least one of:
    extensible markup language;
    document type definition;
    web services;
    remote method invocation common object request broker architecture;
    message queue middleware; and
    hypertext transfer protocol.

6. The method of claim 1, wherein the statistical data comprises at least one of:
    a low value;
    a high value;
    an average value;
    a standard deviation; and
    a variance.

7. The method of claim 1, further comprising:
    reconstructing a data format from the extracted messages.

8. The method of claim 1, wherein creating the reconstructed data stream further comprises:
    validating the sequence of data packets by comparing the sequence of data packets to additional extracted messages from the data stream; and
    updating the model data and sequence of messages based upon the validation.

9. The method of claim 1, wherein the reconstructed data stream is used for at least one of:
    a test;
    a simulation;
    a system analysis;
    a model of a data producer;
    a model of a data consumer;
    a data stream supplement;
    a data stream replacement; and
    reverse engineering of a system.

10. A system for reconstructing a data stream, the system comprising:
    a data producer;
    a data consumer; and
    a data stream reconstructor, the data stream reconstructor performing:
    listening to an original data stream, the original data stream comprised of one or more messages between the data producer and the data consumer;
    extracting messages from the original data stream;
    determining statistical data from the extracted messages;
    creating a reconstructed data stream using the statistical data;
    determining a sequence of messages from the extracted messages;
    creating model data from the statistical data;
    creating a sequence of data packets from the sequence of messages and model data; and
    outputting the sequence of data packets as the reconstructed data stream.

11. The system of claim 10, wherein the data stream reconstructor is implemented by an application plug-in.

12. The system of claim 10, wherein the original data stream comprises messages in an industry standard communication protocol.

13. The system of claim 10, further comprising:
    reconstructing a data format from the extracted messages.

14. The system of claim 10, wherein creating the reconstructed data stream further comprises:
    validating the sequence of data packets by comparing the sequence of data packets to additional extracted messages from the data stream; and
    updating the model data and sequence of messages based upon the validation.

15. A computer program product for reconstructing a data stream, the computer program product comprising:
    a storage medium readable by a processing circuit and storing instructions for execution by the processing circuit for facilitating a method comprising:
    listening to an original data stream;
    extracting messages from the original data stream;
    determining statistical data from the extracted messages;
    creating a reconstructed data stream using the statistical data;
    determining a sequence of messages from the extracted messages;
    creating model data from the statistical data;
    creating a sequence of data packets from the sequence of messages and model data; and outputting the sequence of data packets as the reconstructed data stream.

16. The computer program product of claim 15, further comprising:
reconstructing a data format from the extracted messages.

17. The computer program product of claim 15, wherein creating the reconstructed data stream comprises:

validating the sequence of data packets by comparing the sequence of data packets to additional extracted messages from the data stream; and
updating the model data and sequence of messages based upon the validation.

* * * * *